United States Patent [19]
Pace et al.

[11] Patent Number: 5,977,720
[45] Date of Patent: Nov. 2, 1999

[54] METHOD AND APPARATUS FOR DRIVING AN ELECTROLUMINESCENT LAMP

[75] Inventors: Ermanno Pace; Giorgio Mariani; Alessandro Fasan, all of Phoenix, Ariz.

[73] Assignee: STMicroelectronics, Inc., Carrollton, Tex.

[21] Appl. No.: 08/918,823

[22] Filed: Aug. 26, 1997

[51] Int. Cl.[6] .................................................. H05B 37/02
[52] U.S. Cl. ................................. 315/169.3; 315/209 R; 315/205; 315/244
[58] Field of Search ........................... 315/169.3, 209 R, 315/244, 205, 226, 283

[56] References Cited

U.S. PATENT DOCUMENTS

| 4,170,747 | 10/1979 | Holmes | 315/307 |
|---|---|---|---|
| 4,208,869 | 6/1980 | Hanaoka | 368/84 |
| 4,210,848 | 7/1980 | Suzuki et al. | 315/169.3 |
| 4,277,728 | 7/1981 | Stevens | 315/307 |
| 4,412,155 | 10/1983 | Isaka et al. | 315/246 |
| 4,443,741 | 4/1984 | Tanaka et al. | 315/307 |
| 4,449,075 | 5/1984 | D'Onofrio et al. | 315/169.3 |
| 4,527,096 | 7/1985 | Kindlmann | 315/169.3 |
| 4,899,086 | 2/1990 | Hirata et al. | 315/169.3 |
| 5,313,141 | 5/1994 | Kimball | 315/169.3 |
| 5,349,269 | 9/1994 | Kimball | 315/169.3 |

FOREIGN PATENT DOCUMENTS

0 372 181   6/1990   European Pat. Off. .

*Primary Examiner*—Michael B Shingleton
*Attorney, Agent, or Firm*—David V. Carlson; Theodore E. Galanthay; Lisa K. Jorgenson

[57] ABSTRACT

An electroluminescent lamp is driven by a driving circuit that can supply an approximately sinusoidal signal, a bi-directional sawtooth signal or a single-ended sawtooth signal. Switches selectively transfer energy from a battery to an inductor and then from the inductor to the lamp. In one embodiment, the lamp voltage is compared to a reference waveform, such as a sinusoid. The switches are activated responsive to the error between the lamp voltage and reference waveform to minimize the error. The lamp can thus be driven with a closer approximation of the reference waveform.

30 Claims, 9 Drawing Sheets

METHOD AND APPARATUS FOR DRIVING AN ELECTROLUMINESCENT LAMP

TECHNICAL FIELD

The present invention relates to electroluminescent devices and, more particularly, to driver circuits for electroluminescent devices.

BACKGROUND OF THE INVENTION

Electroluminescent devices are used in a variety of low power applications. For example, many battery-operated devices, such as wrist watches, utilize electroluminescent illuminators to illuminate their displays. In such devices, energy for activating the electroluminescent lamp typically is provided by a battery at a voltage range of 1–9 V. However, for proper operation, electroluminescent lamps operate at much higher voltages, on the order of 50–300 V. Thus, typical battery output voltages are inadequate for directly driving electroluminescent lamps.

Another limitation of battery sources is that batteries supply DC voltages, while electroluminescent displays typically emit light responsive to AC voltages. To improve the lifetime of the lamp and for acceptable performance, the driving voltage for the electrolimrlinescent lamp preferably approximates a sine wave.

A variety of circuit structures have been suggested for driving electroluminescent lamps using batteries as power sources. For example, U.S. Pat. No. 5,349,269 to Kimball employs two inverters that each supply high frequency pulses to a lamp. To improve the efficiency of the lamp, each of the inverters drives an opposite terminal of the lamp so that the overall voltage change across the lamp is twice the voltage of pulses from each of the inverters. Unfortunately, the use of two inverters increases the cost and difficulty of fabrication of the driving circuit, in part because each of the inverters requires a separate inductor.

In another approach described in U.S. Pat. No. 4,527,096 to Kindlmann, a single inductor is used to drive opposite sides of an electroluminescent lamp through a switching network. The inductor drives a first side of the electroluminescent lamp while the second side of the lamp is coupled to ground. The inductor injects current to the first side of the lamp thereby charging the lamp to high voltage. Then, the lamp is discharged by coupling the first side to ground.

The switching network then couples the inductor to the second side and the inductor charges the second side. The second side is then grounded, once again discharging the lamp. The resulting waveform across the electroluminescent lamp is a sawtooth wave having positive and negative peaks. The sawtooth waveform deviates substantially from the preferred sinusoidal waveform and produces a rapid discharge of the electroluminescent lamp at a relatively high current. This rapid discharge can cause premature failure of the lamp and typically does not provide optimum current draw or efficiency.

SUMMARY OF THE INVENTION

An electroluminescent driver circuit includes a switching circuit that has a first set of switches which selectively couple an inductor between a supply voltage and reference voltage in either of two directions. The voltages thus induce current in either of two directions through the inductor, thereby storing energy in the inductor.

A second set of switches then couple the inductor across an electroluminescent lamp simultaneously with the first set of switches isolating the inductor from the supply or reference voltage. When the inductor is isolated from the supply or reference voltage, the stored energy in the inductor produces current flow into the lamp, thereby incrementally charging the lamp. Because the inductor current can be induced in either of two directions, the driver circuit can charge the lamp either positively or negatively.

In one embodiment, a comparator driven by a sinusoidal signal produces clocking signals that control the lamps. The comparator compares the lamp voltage to the sinusoidal signal and adjusts the clocking signals in response. By reducing errors between the lamp voltage and the sinusoidal voltage, the comparator ensures that the lamp is driven by a substantially sinusoidal voltage.

In this embodiment, the switches are configured such that the inductor current can incrementally discharge the electroluminescent lamp as well as incrementally charge the lamp. The driving circuit can sequentially charge and discharge the lamp to produce a substantially sinusoidal voltage across the electroluminescent lamp.

In one embodiment, each end of the inductor is coupled to a respective end of the electroluminescent lamp through a respective unidirectional circuit formed from a parallel combination of a diode and a switch. While a switch is open, its respective diode allows the electroluminescent lamp to be charged by current from the inductor during an interval when energy is being stored in the inductor. The diode and open switch then block current flow out of the lamp to prevent unintended discharging.

Selected switches can then be closed to allow the capacitor to be discharged, either incrementally through the inductor as described above, directly to ground through one of the switches in the first set or through the battery. Because the electroluminescent lamp can be quickly discharged to ground or can be controllably discharged by pulses from the inductor, the electroluminescent lamp can be driven with either a sawtooth type of waveform or with a substantially sinusoidal waveform.

DETAILED DESCRIPTION OF THE INVENTION

Figure 1:
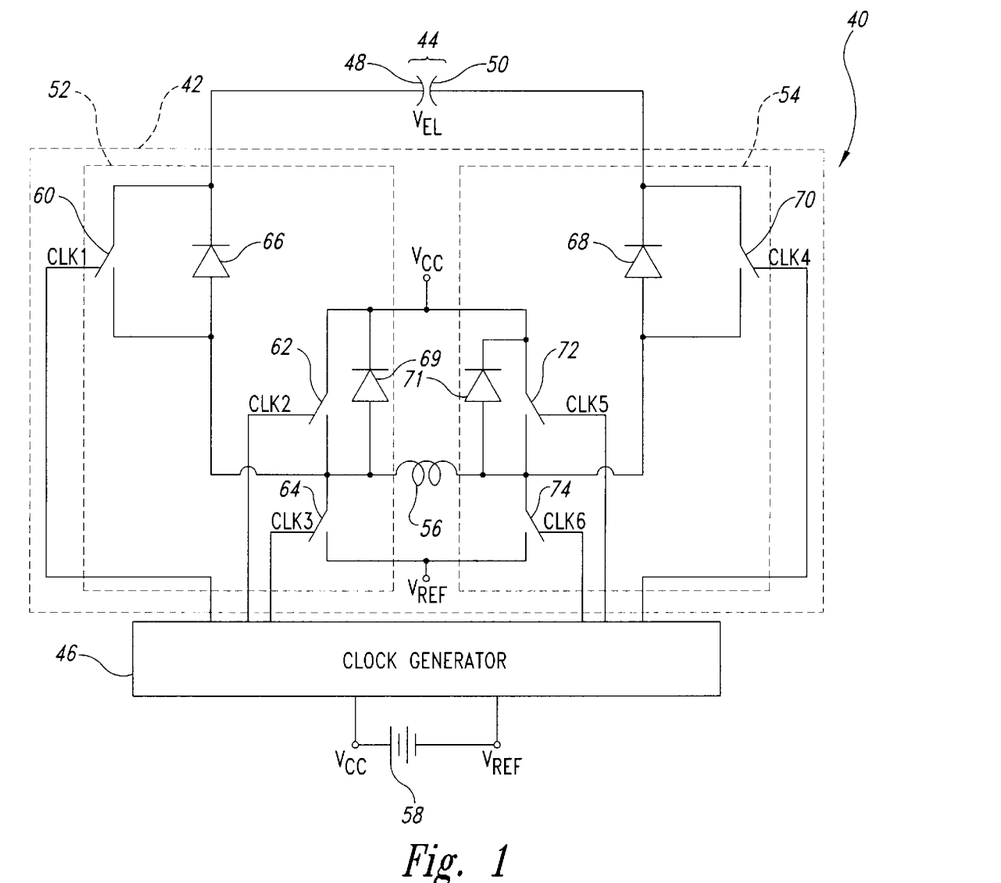
FIG. 1 is a schematic of a driving circuit coupled to an electroluminescent device, according to one embodiment of the invention.

As shown in FIG. 1, an electroluminescent display 40 includes a driver circuit 42 that drives a lamp 44 in response to clock signals CLK1–CLK6 from a clock generator 46. The lamp 44 is a conventional electroluminescent lamp formed from first and second plates, 48, 50, separated by an electroluminescent material. As is known, electroluminescent lamps are largely capacitive and the lamp 44 is therefore represented in the schematic of FIG. 1 by a capacitor symbol. The driver circuit 42 and clock generator 46 receive power from a battery 58 that outputs a DC voltage $V_{CC}$ on the order of 1–9 V. The battery 58 is preferably a commercially available rechargeable battery.

The driver circuit 42 is formed from a left leg 52 and a right leg 54 linked by an inductor 56 and the lamp 44. Each of the legs 52, 54 includes three electronic switches 60, 62, 64, 70, 72, and 74 that open and close responsive to respective clock signals CLK1–CLK6 to provide driver currents $I_{48}$, $I_{50}$ to the first or second plate 48, 50, as will be described in greater detail below. The switches 60, 62, 64, 70, 72, and 74 are preferably formed from NMOS transistors so that the switches 60, 62, 64, 70, 72, and 74 are OFF when their respective clock signals CLK1–CLK6 are low. Additionally, diodes 66, 68, 69, 71 are coupled in parallel with the switches 60, 62, 70, 72 to provide unidirectional current paths between the inductor 56 and the respective plates 48, 50 and before the inductor 56 and the battery 58.

Charging and discharging of the lamp 44 will now be described with reference to the timing diagram of FIG. 2. In the following discussion, it will be assumed for clarity of presentation that each of the clock signals CLK1–CLK6 has transitions at regular intervals. As will be described below with reference to FIGS. 5 and 6, the actual intervals between transitions will vary to allow the lamp voltage to more closely approximate a sinusoid.

At time to the clock signals CLK1, CLK2, CLK6 are low, thereby turning OFF their respective switches 60, 62, 74. Also, at time $t_0$ the clock signals CLK3–CLK5 transition high, thereby turning ON their respective switches 70, 62, 64. As will be described below, the third and fifth clock signals CLK3, CLK5 do not remain continuously high. Therefore, at time $t_0$, the electroluminescent lamp 40 can be modeled with the equivalent circuit of FIG. 3, and current $I_{L1}$, begins to flow through the inductor 56 as shown in the seventh graph of FIG. 2. Because the current $I_{L1}$ is flowing from right to left, the current $I_{L1}$ is shown as negative in this interval.

As is known, the inductor 56 will store energy in response to the inductor current $I_{L1}$, where the total energy stored in the inductor will be:

$$E_I = \tfrac{1}{2} L I_{PK}^2,$$

where $I_{PK}$ is the peak of the inductor current $I_{L1}$ at time $t_1$.

At time $t_1$, the third and fifth clock signals CLK3, CLK5 pulse low briefly, thereby opening the switches 64, 72 so that the inductor 56 and lamp 44 are connected in an isolated loop. Because the current through an inductor will not change instantly, the inductor current $I_{L1}$ continues the flow. However, because there is no path between the inductor 56 and the reference potential $V_{REF}$, the inductor current $I_{L1}$ is forced through the diode 66 as the left leg current $I_{48}$. The left leg current $I_{48}$ charges the left plate 48, thereby increasing the voltage of the left plate 48 incrementally as shown in the eighth graph of FIG. 2.

As the inductor current $I_{L1}$ flows into the left plate 48, energy stored in the inductor 56 is transferred to the lamp 44 and the inductor current $I_{L1}$ falls until time $t_2$. After time $t_2$, the inductor current $I_{L1}$ does not become negative because the diode 66 blocks the left leg current $I_{48}$ from flowing to the inductor 56. The diode 66 thus prevents the left plate 48 from discharging and the increased voltage on the left plate 48 is retained.

At time $t_3$, the low-going pulses of the third and fifth clock signals CLK3, CLK5 end and the switches 64, 72 once again turn ON, thereby providing a path from the supply voltage $V_{CC}$ through the inductor 56 to the reference potential $V_{REF}$. The inductor current $I_{L1}$ begins to flow, thereby storing energy in the inductor 56 once again. Between times $t_3$ and $t_4$, several pulses of the third and fifth clock signals CLK3 and CLK5 arrive, each time increasing the lamp voltage incrementally. Assuming all of the energy stored in the inductor 56 is transferred to the lamp 44 in response to each pulse, the change in voltage across the lamp 44 can be determined by the relationship:

$$\Delta E_C = E_I = \tfrac{1}{2} C \Delta V^2.$$

Figure 2:
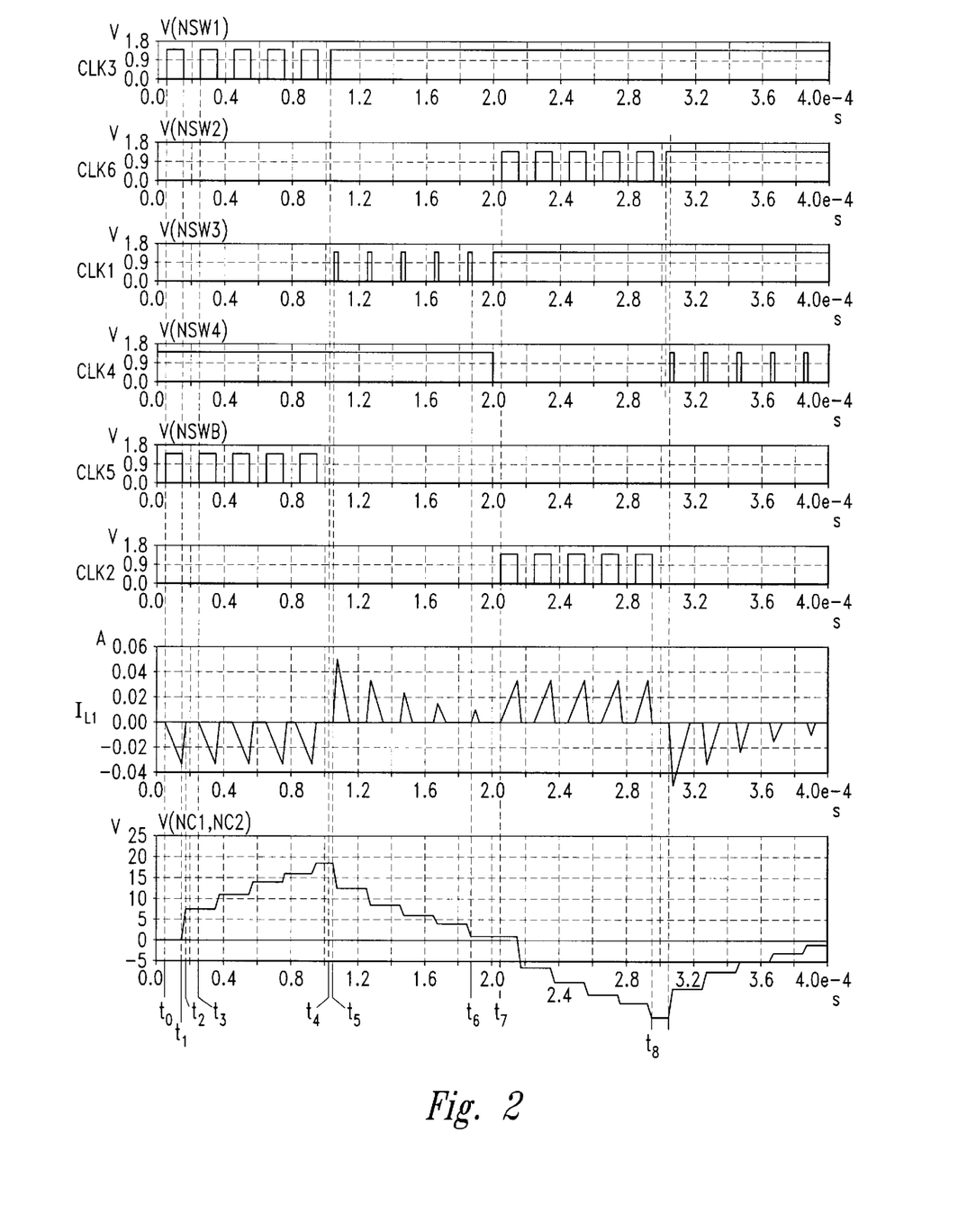
FIG. 2 is a signal timing diagram of various signals within the driver circuit of FIG. 1.
Figure 3:
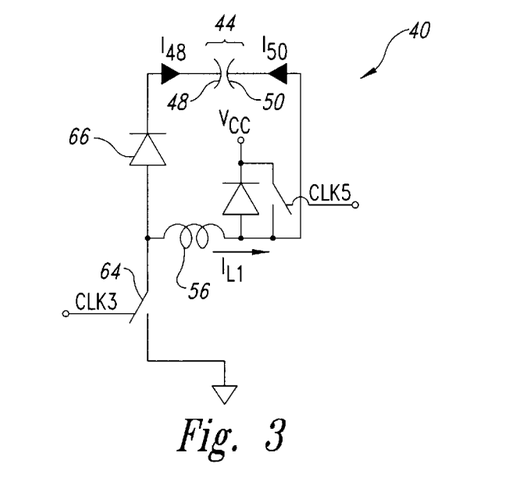
FIG. 3 is an equivalent circuit of the driving circuit of FIG. 1 during charging of a first plate of the electroluminescent lamp.

As shown in the lowermost graph of FIG. 2, the voltage on the left plate 48 rises slightly in response to each of the pulses until the voltage across the lamp 44 is approximately 75 V at time $t_4$.

At time $t_4$, the pulses of the clock signals CLK3, CLK5 terminate with the third clock signal CLK3 remaining high and the fifth clock signal CLK5 remaining low. Therefore, the switch 72 remains OFF and the switch 64 remains ON. The lamp 44 remains charged because neither the diode 66 nor the switch 60 will pass current.

Rather than discharging the lamp 44 quickly, the driving circuit 42 incrementally discharges the left plate 48 to more closely approximate a sine wave. To discharge the left plate 48 in a controlled fashion, the first clock signal CLK1 is pulsed quickly to open and close the switch 60. Each time the switch 60 closes, the voltage across the lamp 44 causes current to flow through the switches 60, 70, inductor 56 and diode 68. In response to each pulse of current, the voltage of the left plate 48 decreases incrementally until time $t_6$.

Figure 4:
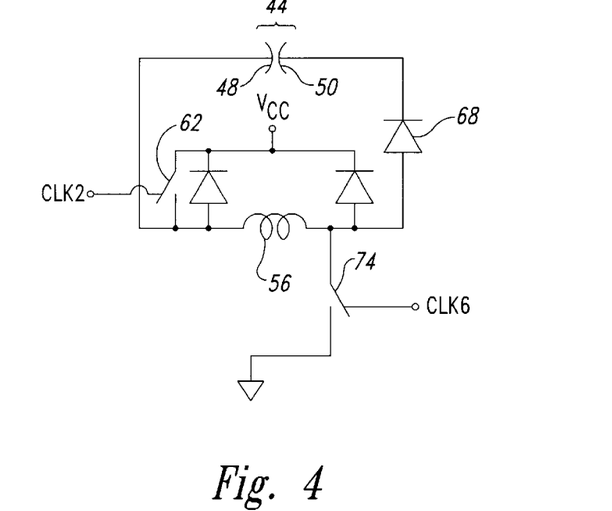
FIG. 4 is an equivalent circuit of the driving circuit of FIG. 1 during charging of a second plate of the electroluminescent lamp.

At time $t_6$, when the voltage across the lamp 44 has reached approximately 0 V, the first clock signal CLK1 remains high so that the switch 60 remains ON. The driving circuit 40 can thus be represented by the equivalent circuit of FIG. 4 after time $t_6$ and the driving circuit 42 is configured to charge the right plate 50.

Advantageously, the diode 71 provides an alternative path for current from the inductor 56 to charge the battery 58 as will now be described. As described above, when the pulse of the first clock signal CLK1 arrives at time $t_5$, current flows through the inductor 56, thereby storing energy in the inductor 56. Slightly after time $t_5$, when pulse returns low, the switch 60 opens, terminating the loop that included the switch 60, the inductor 56, the diode 68 and the lamp 44. The inductor current $I_{L1}$ continues to flow through the only available current path which includes the diode 71, the battery 58, and the switch 64. By forcing current to flow through the battery 58 the inductor 56 transfers a portion of its stored energy back into the battery 58, thereby recharging the battery.

At time $t_7$, a sequence of pulses of the second and sixth clock signals CLK2, CLK6 begins. The pulsed signals CLK2, CLK6 turn the switches 62, 74 ON and OFF. In response to each set of pulses, the right plate 50 is charged by a current $I_{50}$ through the diode 68 in the same manner described above with respect to FIG. 3, until the voltage across the lamp 44 is approximately −75 V at about time $t_8$. After time $t_8$, the sixth clock signal CLK6 stays high holding ON the switch 74 and the second clock signal CLK2 stays low holding OFF the switch 62. Next, the fourth clock signal CLK4 is pulsed to incrementally discharge the right plate 50 in the same fashion described above, until the voltage across the lamp 44 is approximately 0 V. As can be seen from the lowermost diagram of FIG. 2, the voltage across the lamp 44 varies between +75 V and −75 V in a very rough approximation of a sine wave. As above, responsive to each pulse of the fourth clock signal CLK4, a portion of the energy from the lamp 44 is stored in the inductor 56. The stored energy is then transferred to the battery 58 through the diode 69 and switch 74.

Figure 5:
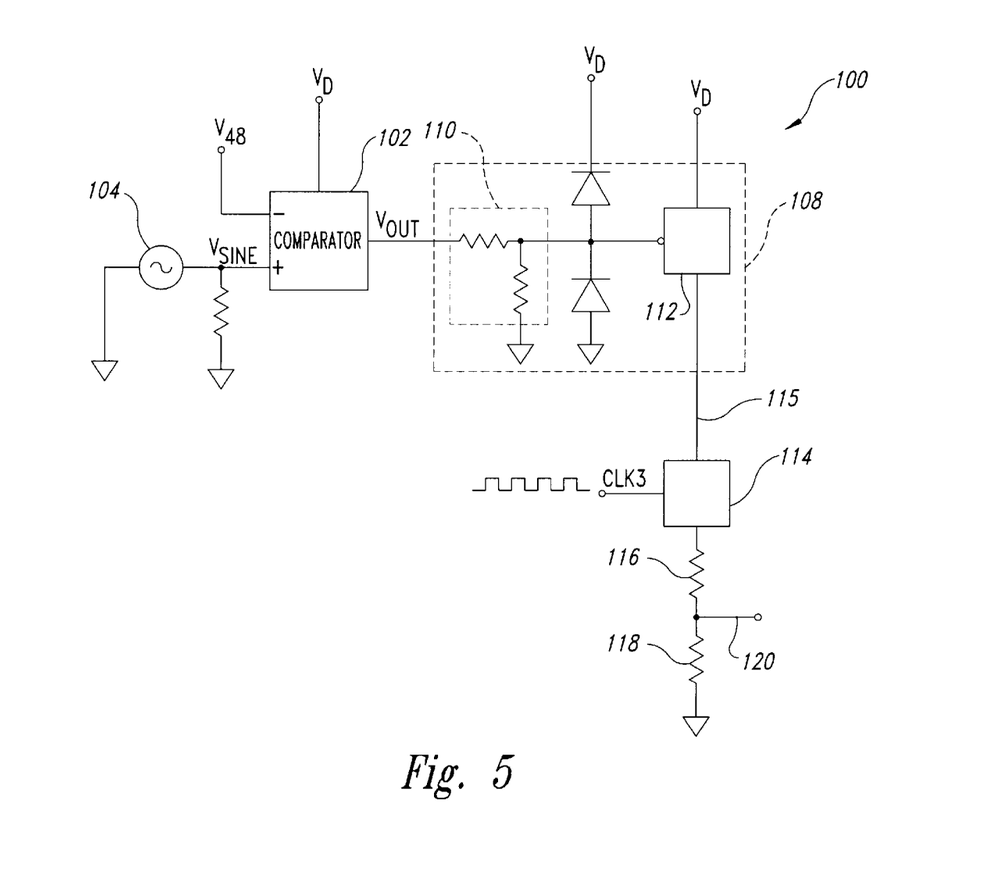
FIG. 5 is a clock generator circuit for producing clock signals to control the driving circuit of FIG. 1.

FIG. 5 shows one embodiment of a control circuit 100 that monitors the voltage across the lamp 44 and adjusts clocking signals CLK1–CLK6 so that the lamp voltage more closely approximates a sine wave. The control circuit 100 includes as its central element a comparator 102 that receives a reference sinusoidal voltage $V_{SINE}$ from a conventional reference source 104. The second input of the comparator 102 is coupled to the left plate 48 so that the comparator 102 continuously compares the voltage $V_{48}$ of the left plate 48 to the reference sinusoidal signal $V_{SINE}$. The comparator 102 has a high gain, on the order of 100, so that the comparator output $V_{OUT}$ is high when the reference sinusoidal signal $V_{SINE}$ is greater than the left plate voltage $V_{48}$. Similarly, the output of the comparator 102 is low whenever the voltage of the left plate $V_{48}$ is greater than the sinusoidal voltage $V_{SINE}$. Thus, the comparator 102 outputs either a high or low voltage indicating whether the left plate voltage $V_{48}$ is greater than or less than the sinusoidal voltage $V_{SINE}$.

The output of the comparator drives a gating circuit 108 formed from a resistor divider 110 and a switch 112. At its input, the switch 112 receives the supply voltage $V_D$ at its input and, at its control terminal, the switch 112 receives a scaled version of the output voltage $V_{OUT}$ from the resistor divider 110. When the comparator output $V_{OUT}$ is high, the switch 112 turns ON, thereby coupling the supply voltage $V_{CC}$ to a node 115. The node 115 thus receives the supply voltage $V_{CC}$ when the plate voltage $V_{48}$ is less than the sinusoidal signal $V_{SINE}$.

Figure 6:
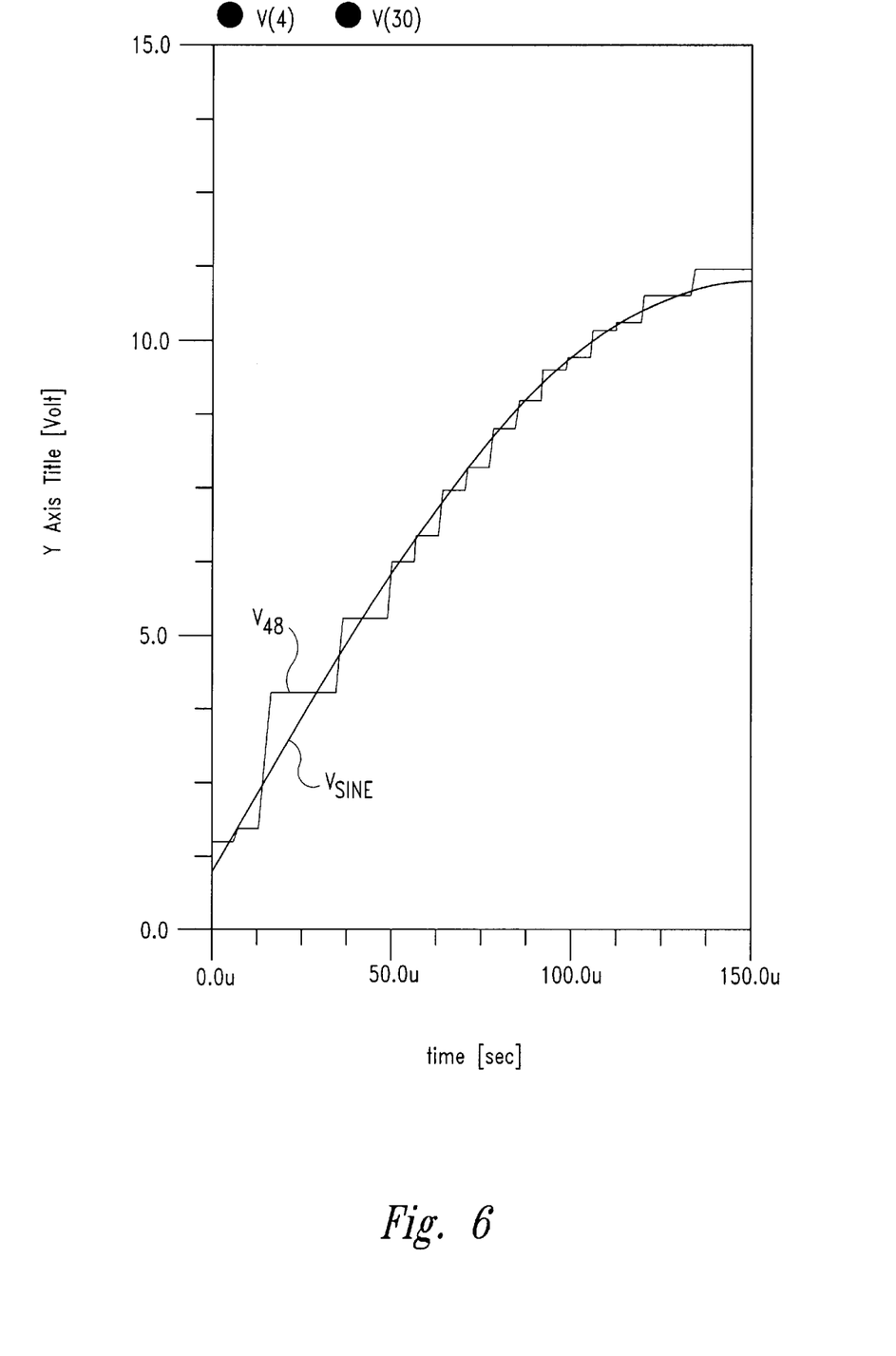
FIG. 6 is a signal timing diagram showing the lamp voltage tracking a reference sinusoidal voltage.

The node 115 forms an input of a gating switch 114 controlled by the clock signal CLK3. The output of the gating switch 114 is then coupled to ground through a pair of resistors 116, 118. When the output of the comparator 102 is high, the voltage at the output terminal 120 will mirror the clock signal CLK3. Thus, when the voltage of the left plate $V_{48}$ falls below the sinusoidal voltage $V_{SINE}$, the control circuit 100 provides pulses substantially synchronized to the third clock signal CLK3 that activate the first switch 64. As described above, the pulses input to the first switch 64 incrementally charge the left plate 48, thereby increasing the left plate voltage $V_{48}$. As shown in the graph of FIG. 6, the control circuit causes the voltage of the left plate to rise incrementally while substantially tracking the sinusoidal voltage $V_{SINE}$.

To track the sinusoidal voltage during discharging (i.e., between times $t_4$ and $t_6$ in FIG. 2), the input to the control switch 104 is set high, the second, fifth and sixth clock signals CLK2, CLK6 are set low, and the third and fourth clock signals CLK3, CLK4 are set high. The lamp 44 and inductor 56 thus form a loop controlled by the switch 60.

The fifth clock signal CLK5 is set high to provide a reference to ground through the switch 72 and the battery 58.

The switch 60 is controlled by an inverse of the output of the comparator 102 rather than by the third clock signal CLK3 of FIG. 2. As the sinusoidal signal $V_{SINE}$ falls, the left plate voltage $V_{48}$ becomes greater than the sinusoidal signal $V_{SINE}$. The comparator output $V_{OUT}$ transitions low in response and the inverted comparator output transitions high, thereby turning ON the switch 60. The closed switch 60 allows current to flow from the left plate 48 through the inductor 56 to the right plate 50, thereby lowering the lamp voltage $V_{EL}$ and the voltage of the left plate 48. As the left plate 48 discharges, the left plate voltage $V_{48}$ falls below the sinusoidal signal, thereby causing the comparator output to transition high. The inverted version of the comparator output turns OFF the switch 60, ending discharge of the left plate 48 until the sinusoidal signal $V_{SINE}$ once again falls below the left plate voltage $V_{48}$. The continuous adjustment of the left plate voltage $V_{48}$ allows the lamp voltage $V_{EL}$ to track the sinusoidal signal $V_{SINE}$ closely.

One skilled in the art will recognize that the left plate voltage $V_{48}$ may be smoothed through conventional filtering techniques and by selecting the appropriate inductance and capacitance of the inductor 56 and lamp 44 to provide an appropriate resonant frequency for the driving circuit 42. Also, one skilled in the art will recognize that a substantially identical control circuit to the control circuit 100 of FIG. 5 (with appropriately reversed polarities) can be used to ensure that the negative portion of the lamp voltage $V_{EL}$ is also substantially sinusoidal. Also, through an appropriate switching structure, the same control circuit 100 can be used to drive the right plate 58 in the same fashion as the left plate 48. In such a structure, the right plate voltage $V_{50}$ would be increasingly positive relative to the left plate voltage $V_{48}$ so that the lamp $V_{EL}$ voltage as described above would be negative.

Figure 7:
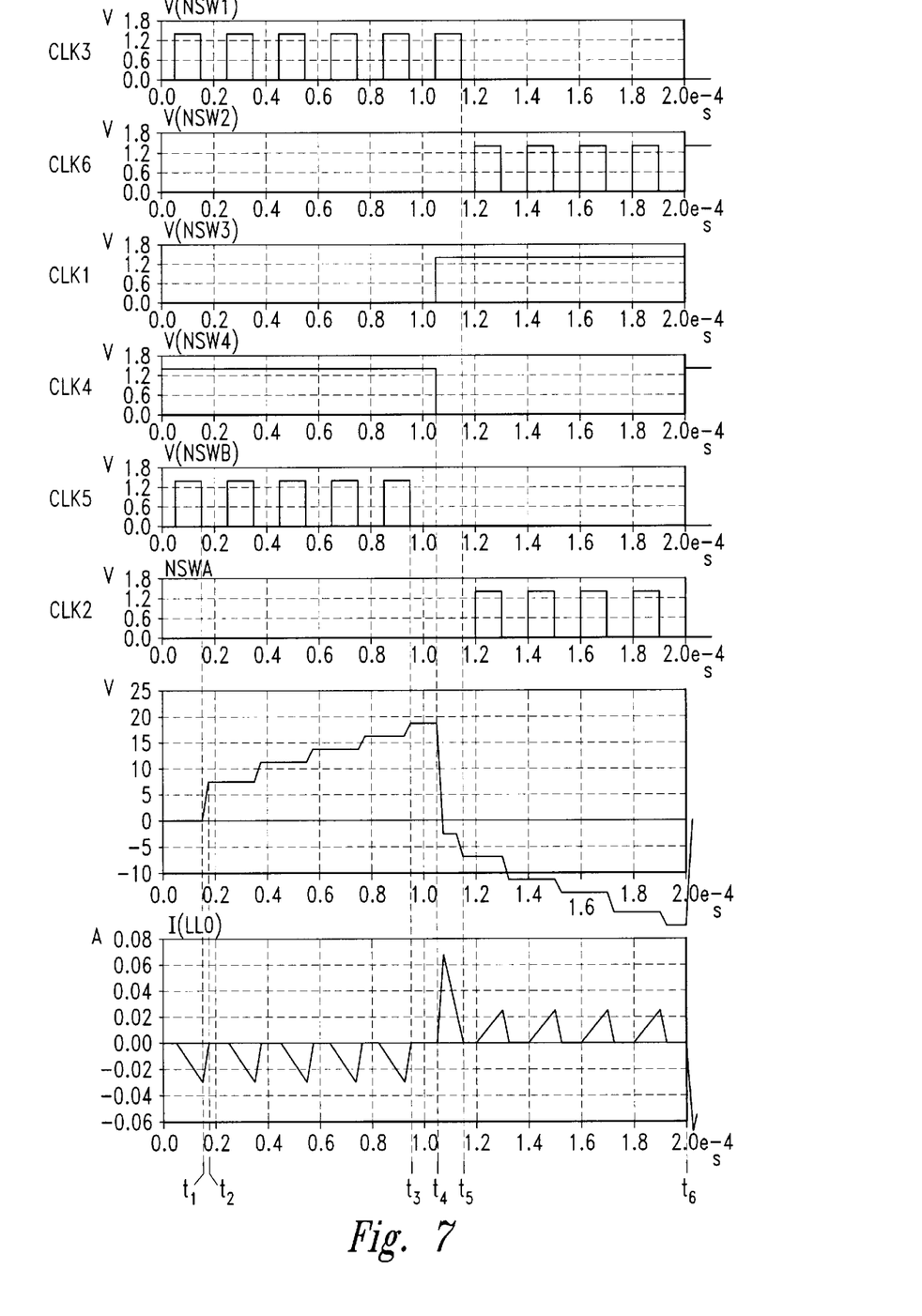
FIG. 7 is a signal timing diagram of various signals within the driver circuit of FIG. 1 for an alternative method of driving the lamp with a sawtooth wave.

Although the driving circuit 42 can produce an approximate sinusoidal waveform for driving the lamp 44 when driven by the circuitry of FIG. 5, the driving circuit 42 can also produce a sawtooth or alternating sawtooth waveform, as will now be described with reference to the signal timing diagram of FIG. 7. As shown in the first through sixth graphs of FIG. 7, the clock signals CLK1–CLK6 for producing a sawtooth waveform are identical to those of FIG. 2 for the period from $t_0$ to $t_3$. Then, at time $t_4$, the first clock signal CLK1 and the third clock signal CLK3 both transition high. The switches 60, 64 are thus both ON, forming a direct path between the left plate 48 and ground. Consequently, the left plate quickly discharges to ground, thereby reducing the voltage across the lamp 44 to approximately 0 V.

At time $t_5$, the third clock signal CLK3 transitions low, thereby turning OFF the switches 64, 70. Briefly thereafter, at time $t_5$, the fourth clock signal CLK4 transitions low, so that the driving circuit 42 can be represented by the equivalent circuit of FIG. 4 once again. The right plate 50 is then charged to approximately 75 V by pulsing the second and sixth clock signals CLK2, CLK6 until the voltage equals 75 V at time $t_5$. Then, at time $t_5$, the fourth and sixth clock signals CLK4, CLK6 both transition high, thereby providing a direct path between the right plate 50 and ground. The direct path quickly discharges the right plate 50 so that the voltage across the lamp 44 once again returns to 0 V. The overall waveform defined by the lamp voltage $V_{EL}$ is thus a bi-directional sawtooth wave.

One skilled in the art will recognize that, rather than providing the input signal shown between times $t_4$ and $t_6$ in FIG. 5, the signals between times $t_0$ and $t_3$ can merely be repeated to produce a single-ended sawtooth wave. Thus, the driving circuit 42 of FIG. 1 can be used to produce an approximately sinusoidal wave, a single-ended sawtooth wave, or a double-ended sawtooth wave.

Figure 8:
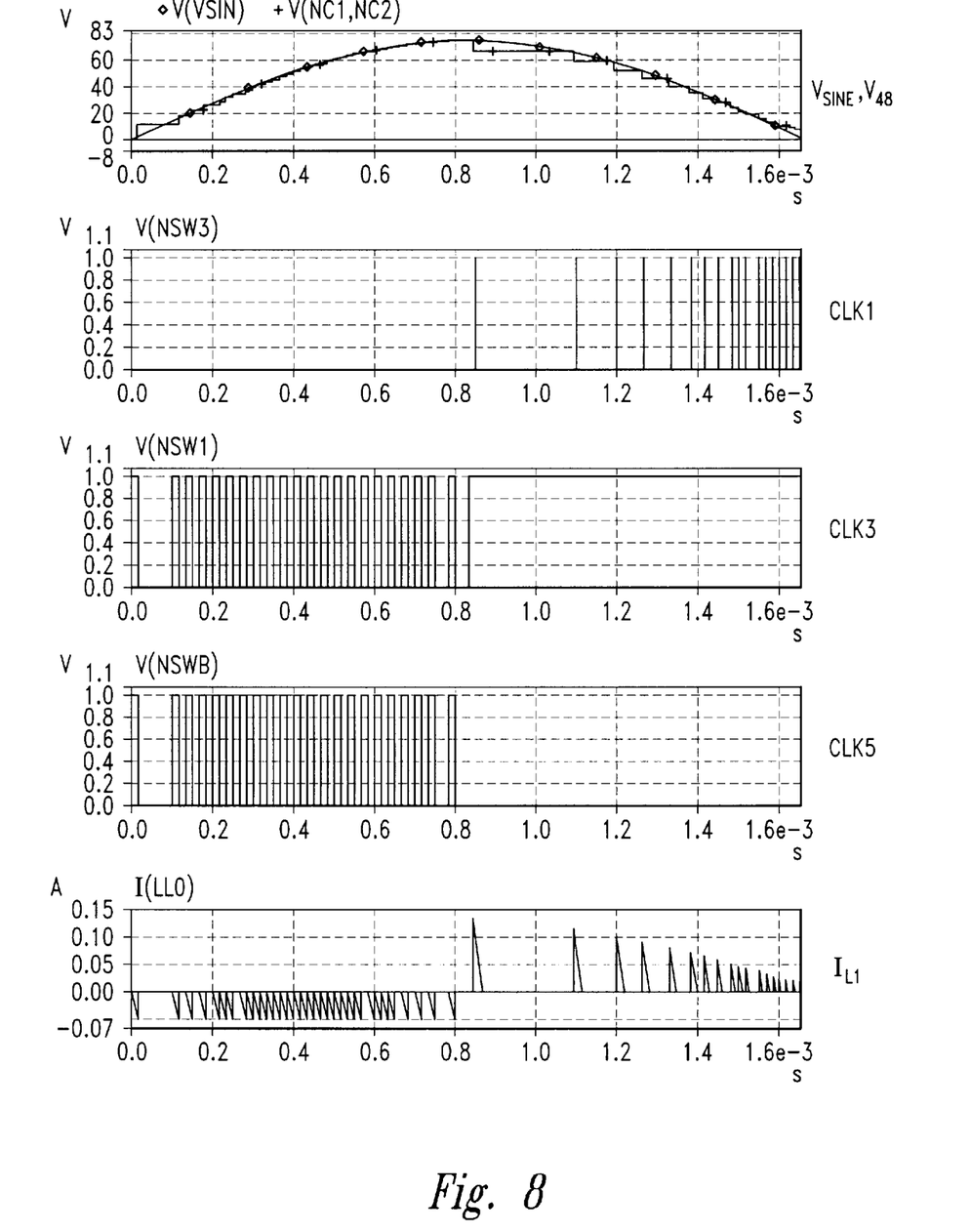
FIG. 8 is a signal timing diagram of various signals within the driver circuit of FIG. 1 where pulses are spaced unevenly.
Figure 9:
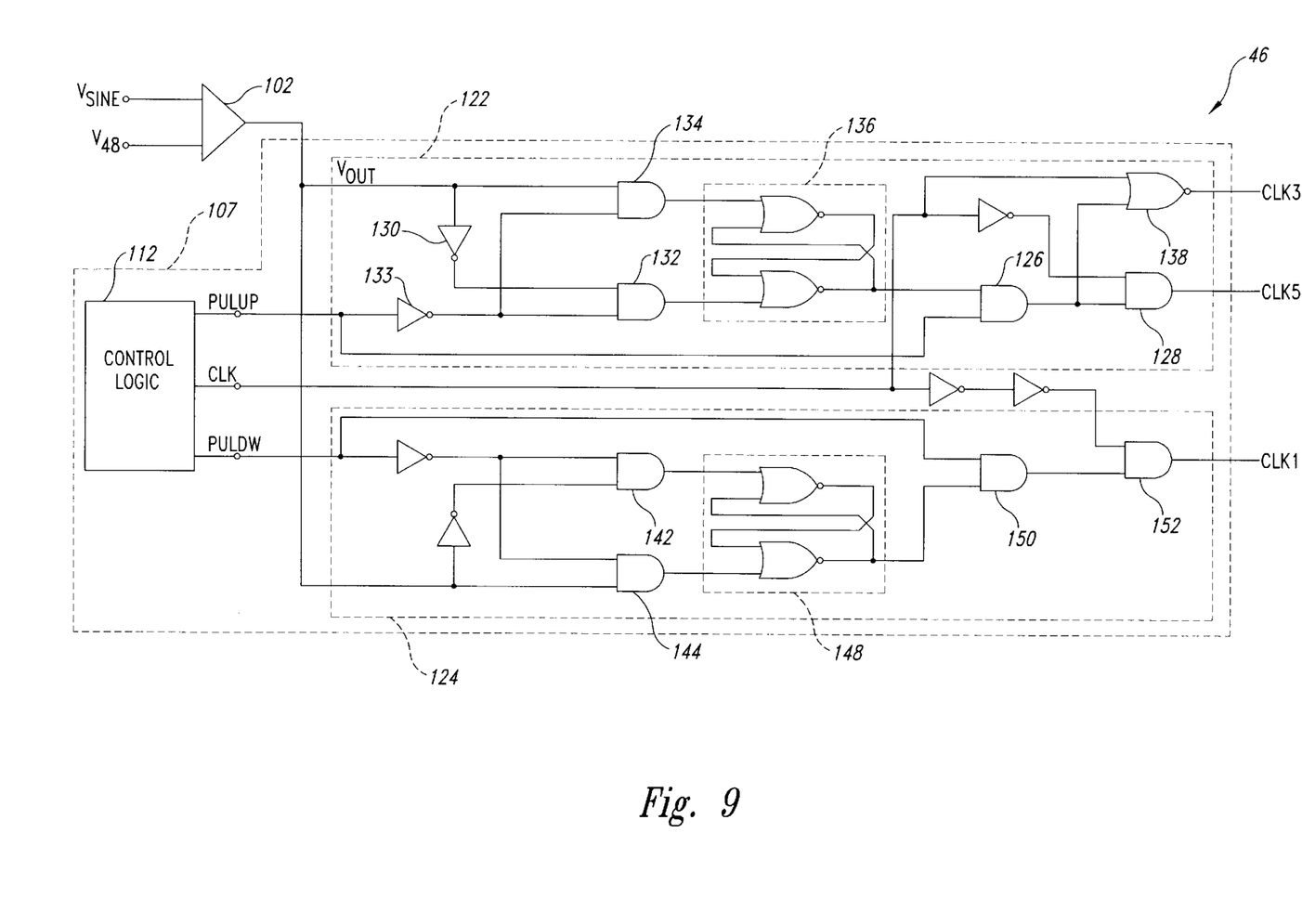
FIG. 9 is a circuit schematic of a clock signal generating circuit for use with the driver circuit of FIG. 1.

To further improve tracking of the sinusoidal signal $V_{SINE}$ (or any other desired waveform), pulses of the clocking signal CLK1–CLK4 may be unevenly spaced as can be seen in the timing diagrams of FIG. 8. One approach to producing such signals is shown in the clock generating circuit 46 of FIG. 9. As with the circuit of FIG. 5, the sinusoidal signal $V_{SINE}$ and the left plate voltage $V_{48}$ are input to the comparator 102 to produce the signal $V_{OUT}$. However, in the embodiment of FIG. 9, the gating circuit 108 is replaced with a clock circuit 107, formed from two separate legs 122, 124 and a logic control circuit 112. The upper leg 122 produces the third and fifth clocking signals CLK3, CLK5, while the lower leg 124 produces the first clocking signal CLK1. The legs 122, 124 both receive the output signal $V_{OUT}$ from the comparator 102 and a master clock CLK from the logic control circuit 112. In addition, the upper leg 122 receives an up-enable signal PULUP and the lower leg 124 receives a down-enable signal PULDW from the logic control circuit 112 to enable the fifth and first clock signals CLK5, CLK1, respectively. The logic control circuit 112 may be of a conventional type such as an application specific integrated circuit (ASIC).

Considering first the upper leg 122, when the up-enable signal PULUP is low, a control AND gate 126 outputs a "0" that drives an output AND gate 128. In response, the output AND gate 128 outputs a low signal as the fifth clock signal CLK5. Thus, when the up-enable signal PULUP is low, the fifth clock signal CLK5 is low, thereby holding the switch 72 (FIG. 2) is OFF. Similarly, when the down-enable signal PULDW is low, the first clock signal CLK1 is low as will be described below, thereby turning OFF the switch 62 to block current flow into the left plate 48. When one of the up-enable or down-enable signals PULUP, PULDW is high, the respective leg 122, 124 is enabled and the clock signals CLK1 or CLK3, CLK5, are controlled by the relative magnitude of the sinusoidal signal $V_{SINE}$ and the left plate voltage $V_{48}$.

Returning to the upper leg 122, if the sinusoidal signal $V_{SINE}$ is higher than the left plate voltage $V_{48}$, the output signal $V_{OUT}$ will be high. The high output signal $V_{OUT}$ is inverted by an inverter 130 so that an input AND gate 132 receives a low signal at one input. The remaining input of the AND gate 132 receives an inverted version of the up enable signal PULUP from an inverter 133. The low input signals force the output of the AND gate 132 low.

At the same time, an input AND gate 134 outputs a high signal in response to the high inverted up-enable signal PULUP and the high output signal $V_{OUT}$. The outputs of the AND gates 132, 134 drive a latch 136 that outputs a high signal to the control AND gate 126 in response. Because the up-enable signal PULUP drives the remaining input of the control AND gate, the output of the control AND gate 126 is high. The high output of the control AND gate 122 drives one input of an output OR gate 138 to set the third clock signal CLK3 high. At the same time, the AND gate output drives the output AND gate 128, thereby enabling the fifth clock signal CLK5. The output AND gate 128 is driven by an inverted version of the clock signal CLK so that the fifth clock signal CLK5 is an inverted version of the clock signal CLK.

Thus as can be seen in FIG. 8, the first clock signal CLK1 is low during the time that the left plate is being charged. As also shown in FIG. 8, the third and fifth clock signals substantially follow the master clock signal CLK except when the left plate voltage $V_{48}g$ exceeds the sinusoidal signal $V_{SINE}$. As described above, the driving circuit 42 responds to pulses of the first, third and fifth clock signal CLK1, CLK3, CLK5 by selectively charging the left plate 48. For brevity, the description will not be repeated here.

The lower leg 124 operates in similar fashion to the upper leg 122. When the down-enable signal PULDW is low, a pair of input AND gates 142, 144 are enabled. The upper AND gate 142 thus outputs a "1" whenever the output signal $V_{OUT}$ is low, while the lower AND gate 144 outputs a "1" whenever the output signal $V_{OUT}$ is high. Consequently, whenever the output signal $V_{OUT}$ is less than the left plate voltage $V_{48}$, a latch 148 outputs a high signal to a control AND gate 150 that receives the downenable signal PULDW at its second input. The control AND gate 150 then outputs a "1" to an output AND gate 152 that receives the master clock CLK at its second input. The output of the output AND gate 152 forms the first clock signal CLK1 in response. Thus, the lower leg 124 activates the switch 60 whenever the master clock signal CLK is high, the down-enable signal PULDW is high and the sinusoidal voltage $V_{SINE}$ is greater than the left plate voltage $V_{48}$. As discussed above, when the switch 60 is ON, the left plate is discharged through the inductor end switch 72 to ground. As noted above, when the down-enable signal PULDW is low, the outputs of the AND gates 150, 152 are both held low, so that the first clock signal CLK1 is held low.

Figure 10:
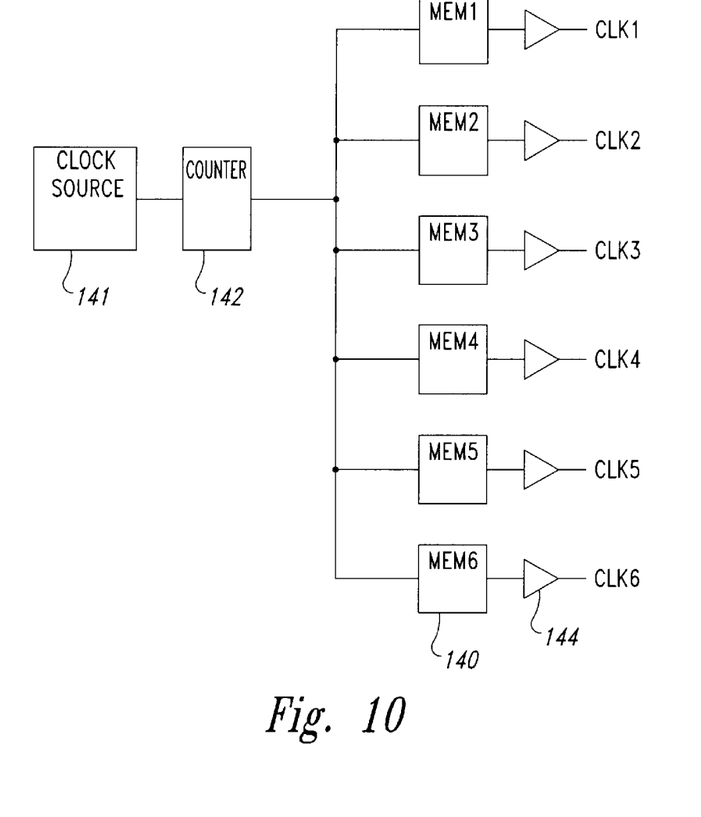
FIG. 10 is a circuit schematic of a first alternative clock signal source for use with the driver circuit of FIG. 1.

In another embodiment of the clock circuit 107 shown in FIG. 10, the timing of the clock signals CLK1–CLK5 is determined by a set of look-up tables in respective nonvolatile memory devices 140. The memory devices 140 are commercially available devices, such as conventional programmable read-only memories. In this embodiment, the master clock signal CLK is supplied by a conventional clock source 141 and drives a conventional counter 142. In response, the counter 142 outputs an increasing or decreasing binary count that is applied to the address inputs of each of the memory devices 140. In response, the memory devices 140 output data from their respective look-up tables. The output data drive respective buffers 144 to produce the clock signals CLK1–CLK5. The look-up table data and thus the appropriate timing of the clock signals CLK1–CLK5 is determined empirically in this embodiment, although a variety of other approaches to establishing timing of the clock signals CLK1–CLK5 can be used. Moreover, one skilled in the art will recognize that implementation of such timing based upon data in a look-up table can be realized in a variety of circuits. For example, in an alternative approach, the data may be clocked serially out of the shift register in response to the master clock signal CLK.

Figure 11:
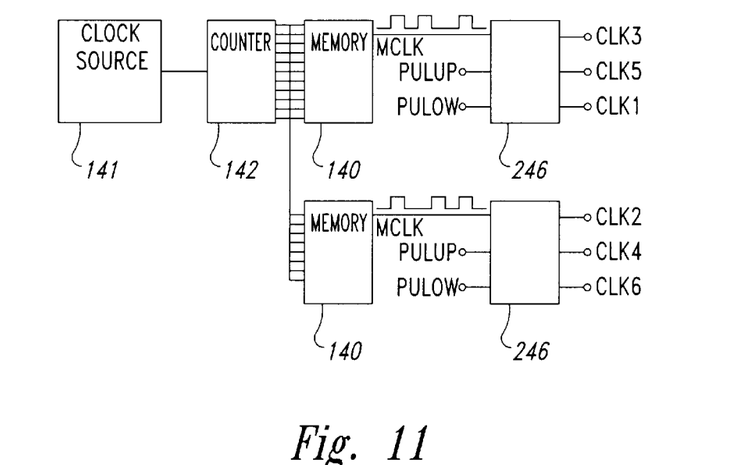
FIG. 11 is a circuit schematic of a second alternative clock signal source for use with the driver circuit of FIG. 1.

FIG. 11 shows another embodiment of the invention where the six memory devices 140 of FIG. 10 are replaced with two memory devices 140 and two clock logic circuits 246. The clock logic circuits 246 may be realized with the clock generating circuit of FIG. 9 or with a variety of other circuit structures.

In the embodiment of FIG. 11, the clock source 140 and counter 141 sequentially address locations in the memory devices 140 as described above. In response, each of the memory device 140 outputs a sequence of data that forms the respective master clock signal CLK. The master clock signal CLK, and the up and down enable signals PULUP, PULDW drive the clock logic circuits 246 to produce the clock signals CLK1–CLK6.

Figure 12:
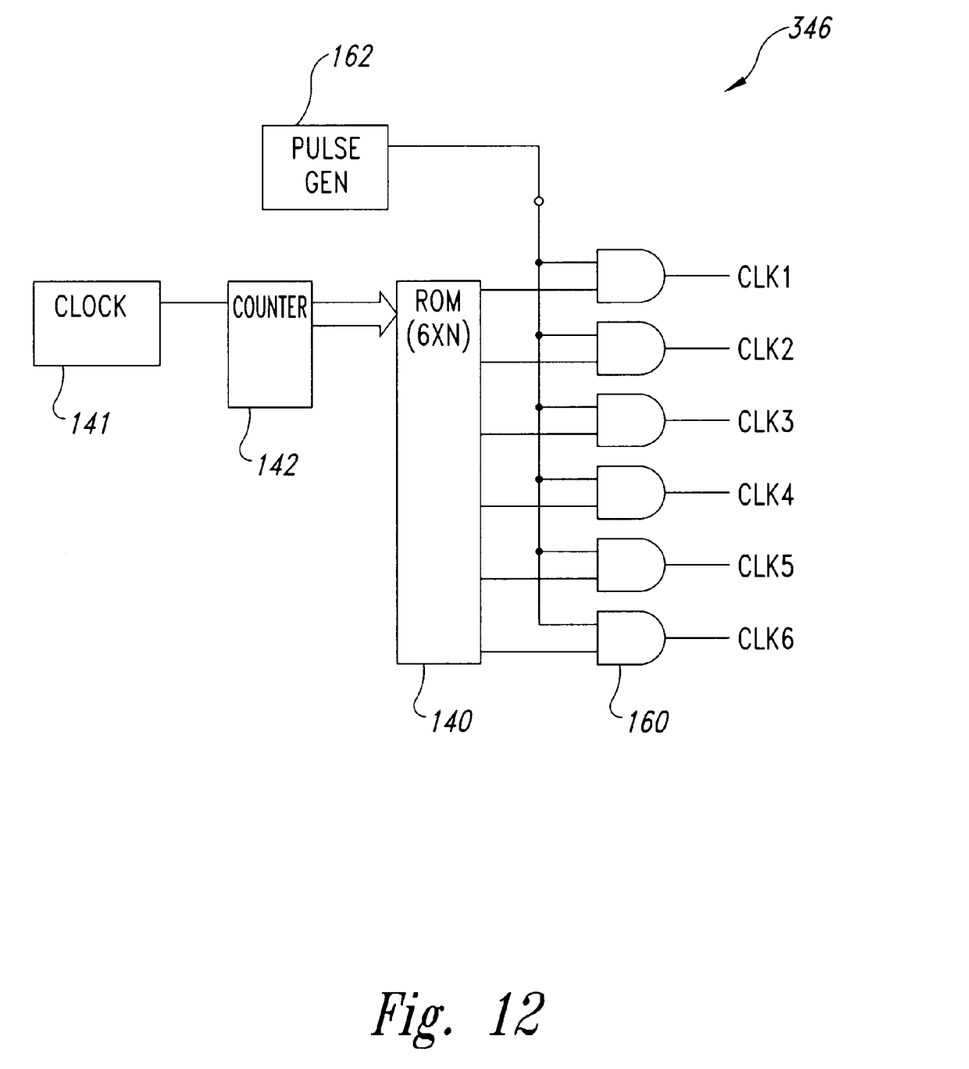
FIG. 12 is a circuit schematic of a third alternative clock signal source for use with the driver circuit of FIG. 1.

FIG. 12 shows another embodiment of a clock generating circuit 346. As with the above described embodiments, the clock generating circuit 346 is driven by the sequentially addresses locations in a 6×N nonvolatile memory device 140.

The memory device 140 is a commercially available device that outputs data on 6 or more data lines responsive to counts from the counter 141. Like the 6 separate memory devices 140 of FIG. 10, the single memory device of FIG. 12 outputs 6 separate data streams, each corresponding to one of the clock signals CLK1–CLK6. Additionally, each set of output data is gated by a respective AND gate 160 that is driven by control pulses from a pulse generator 162. By selectively enabling the respective AND gates, the control pulses control overall operation of the clock generating circuit 346 and synchronize the clock signals CLK1–CLK6.

Although the invention has been described herein by way of an exemplary embodiment, one skilled in the art will recognize that variations may be without departing from the spirit and scope of the invention. For example, the embodiments of FIGS. 5 and 9–12 can track waveforms other than sinusoidal or sawtooth. Accordingly, the invention is not limited except by the appended claims.

What is claimed is:

1. An electroluminescent driver circuit for driving an electroluminescent device having first and second driving terminals, comprising:
   a voltage input terminal;
   a reference input terminal;
   an inductor having a first end and a second end;
   a first switch coupled between the voltage input terminal and the first end, the first switch having a first switching terminal and being responsive to a first control signal at the first switching terminal to open or close;
   a second switch coupled between the voltage input terminal and the second end, the second switch having a second switching terminal and being responsive to a second control signal at the second switching terminal to open or close;
   a third switch coupled between the reference input terminal and the first end, the third switch having a third switching terminal and being responsive to a third control signal at the third switching terminal to open or close;
   a fourth switch coupled between the reference voltage terminal and the second end, the fourth switch having a fourth switching terminal and being responsive to a fourth control signal at the fourth switching terminal to open or close;
   a first output terminal for coupling to the first driving terminal;
   a second output terminal for coupling to the second driving terminal;
   a first unidirectional coupler circuit coupled between the first end and the first output terminal; and
   a second unidirectional coupler circuit coupled between the second end and the second output terminal.

2. The driver circuit of claim 1, further comprising a signal source having first, second, third and fourth signal terminals coupled to the first, second third, and fourth switching terminals, respectively, the signal source being operative to provide the first, second, third and fourth control signals at the first second, third and fourth signal terminals, respectively.

3. The driver circuit of claim 2 wherein the signal source is operative to produce the third control signal with a plurality of pulses in a single period of the first control signal.

4. The driver circuit of claim 3 wherein the signal source is operative to produce a plurality of pulses within a single period of the first control signal.

5. The driver circuit of claim 1 wherein the fourth control signal includes a plurality of pulses in a single period of the first control signal.

6. The driver circuit of claim 1 wherein the first and second unidirectional coupler circuits each include:
   a switch; and
   a unidirectional bypass path.

7. The driver circuit of claim 6 wherein the unidirectional bypass path includes a diode.

8. The driver circuit of claim 1, further comprising a first diode coupled between the first end and the second end, in parallel with the first switch.

9. The driver circuit of claim 1, further comprising a second diode coupled between the second end and the voltage input terminal, in parallel with the second switch.

10. A high voltage source having an output and responsive to a set of clocking signals and an input supply voltage to produce a periodic signal having a peak voltage greater than the supply voltage, comprising:
    an inductive circuit having first and second terminals and being responsive to an input voltage across the first and second terminals to store energy;
    a first switching circuit coupled to the inductive circuit between the first and second terminals, the first switching circuit having a first control terminal and a first voltage terminal adapted to receive the supply voltage, the first switching circuit configured to respond to a first of the clocking signals at the first control terminal to apply the supply voltage between the first and second terminals in a first direction;
    a second switching circuit coupled to the inductive circuit between the first and second terminals, the second switching circuit having a second control terminal and a second voltage terminal adapted to receive the supply voltage, the second switching circuit configured to respond to a second of the clocking signals at the second control terminal to apply the supply voltage across the first and second terminals in a second direction opposite the first direction;
    a first unidirectional circuit having a first circuit input coupled to the first terminal and a first output terminal coupled to the output of the high voltage source, the first unidirectional circuit including a first unidirectional circuit element configured to either permit an incremental transfer of energy from the first terminal to the first output terminal or block a transfer of energy from the first output terminal to the first terminal; and
    a second unidirectional circuit having a second circuit input coupled to the second terminal and a second output terminal coupled to the output of the high voltage source, the second unidirectional circuit including a second unidirectional circuit element configured to either permit an incremental transfer energy from the second terminal to the second output terminal or block a transfer of energy from the second output terminal to the second terminal.

11. The high voltage source of claim 10 wherein the first switching circuit includes a first switch and a first diode coupled in parallel.

12. The high voltage source of claim 10 wherein the second switching circuit includes a second switch and a second diode coupled in parallel.

13. The high voltage source of claim 10 wherein the first unidirectional circuit further includes a first bypass switch coupled in parallel with the first unidirectional circuit element, the first bypass switch having a first control terminal and responsive to a respective one of the clocking signals to provide a first conductive path bypassing the first unidirectional circuit element.

14. The high voltage source of claim 10 wherein the second unidirectional circuit further includes a second bypass switch coupled in parallel with the second unidirectional circuit element, the second bypass switch having a second control terminal and responsive to a respective one of the clocking signals to provide a second conductive path bypassing the second unidirectional circuit element.

15. The high voltage source of claim 10 wherein the first unidirectional circuit element is a first diode.

16. The high voltage source of claim 10 wherein the second unidirectional circuit element is a second diode.

17. The high voltage source of claim 10 wherein the first and second switching circuits are responsive to the first and second clocking signals to isolate the inductive circuit from the supply voltage.

18. A method of activating an electroluminescent lamp comprising:

coupling a switching circuit between first and second terminals of an inductive circuit;

storing a first energy portion in the inductive circuit by using the switching circuit to provide a first current through the inductive circuit in a first direction;

increasing voltage on a first plate of the lamp relative to a second plate by transferring the first energy portion to the lamp; and decreasing the voltage on the first plate by discharging a first part of the first energy portion from the lamp in a plurality of steps through the inductive circuit.

19. The method of claim 18 wherein the decreasing the voltage on the first plate further includes transferring a second part of the first energy portion to a battery.

20. The method of claim 18, further including:

storing a second energy portion in the inductive circuit by inducing a second current through the inductive circuit in a second direction opposite from the first direction;

increasing the voltage on the second plate of the lamp relative to the first plate by transferring the second energy portion to the lamp; and decreasing the voltage on the first plate by discharging a first part of the second energy portion from the lamp in a plurality of steps through the inductive circuit.

21. The method of claim 20 wherein the decreasing the voltage on the first plate further includes transferring a second part of the first energy portion to a battery.

22. The method of claim 20, further including transferring a second part of the second energy portion to a battery.

23. The method of claim 18 wherein the discharging the first energy portion from the lamp includes periodically connecting the inductive circuit between the first plate and a reference potential.

24. A method of driving a capacitive load with a periodic voltage, comprising:

providing a supply voltage with a battery;

coupling a switching circuit between first and second terminals of an inductive circuit to allow the supply voltage to be applied to the inductive circuit;

producing a first clocking signal having a first plurality of pulses;

in response to each pulse of the first clocking signal, applying the supply voltage to the inductive circuit in a first direction to store a first energy portion in the inductive circuit;

producing a second clocking signal having a second plurality of pulses;

in response to each pulse of the second clocking signal, applying the supply voltage to the inductive circuit in a second direction opposite of the first direction to store a second energy portion in the inductive circuit;

producing a third clocking signal having a third plurality of pulses;

in response to selected pulses of the third clocking signal, transferring the first energy portion from the inductive circuit to the capacitive load;

producing a fourth clocking signal having a fourth plurality of pulses; and in response to selected pulses of the fourth clocking signal, transferring the second energy portion from the inductive circuit to the capacitive load.

25. The method of claim 24, further comprising transferring a first part of the first energy portion from the capacitive load to the battery.

26. The method of claim 24, further comprising transferring a first part of the second energy portion from the capacitive load to the battery.

27. The method of claim 24 wherein the applying the supply voltage to the inductive circuit in a first direction includes:

coupling the first terminal of the inductive circuit to a voltage source; and coupling the second terminal of the inductive circuit to ground.

28. The method of claim 24 wherein the applying the supply voltage to the inductive circuit in a second direction includes:

coupling the first terminal of the inductive circuit to ground; and coupling the second terminal of the inductive circuit to a voltage source.

29. The method of claim 24 wherein the in response to pulses of the third clocking signal, transferring the first energy portion from the inductive circuit to the capacitive load includes after inducing a current through the inductive circuit, isolating the first terminal of the inductive circuit from ground.

30. The method of claim 24, further including after inducing a current through the inductive circuit, isolating the inductive circuit from the supply voltage.

* * * * *